United States Patent
Lang et al.

(10) Patent No.: US 10,334,788 B2
(45) Date of Patent: Jul. 2, 2019

(54) BALER WITH MASS FLOW SENSING ASSEMBLY AND METHOD OF INITIATING STUFFER TRIP

(71) Applicants: Deere & Company, Moline, IL (US); Iowa State University Research Foundation, Inc., Ames, IA (US)

(72) Inventors: Eric R. Lang, Newhall, IA (US); Jeffrey Askey, Boone, IA (US); Daniel E. Derscheid, Hedrick, IA (US)

(73) Assignees: DEERE & COMPANY, Moline, IL (US); IOWA STATE UNIVERSITY RESEARCH FOUNDATION, INC., Ames, IA (US)

( * ) Notice: Subject to any disclaimer, the term of this patent is extended or adjusted under 35 U.S.C. 154(b) by 0 days.

(21) Appl. No.: 14/855,164

(22) Filed: Sep. 15, 2015

(65) Prior Publication Data
US 2016/0088800 A1 Mar. 31, 2016

Related U.S. Application Data

(60) Provisional application No. 62/057,016, filed on Sep. 29, 2014.

(51) Int. Cl.
*A01F 15/10* (2006.01)
*A01F 15/04* (2006.01)
(Continued)

(52) U.S. Cl.
CPC ............ *A01F 15/10* (2013.01); *A01F 15/044* (2013.01); *A01F 15/0825* (2013.01); *B30B 9/3007* (2013.01); *B30B 9/3078* (2013.01)

(58) Field of Classification Search
CPC .... A01F 15/10; A01F 15/044; A01F 15/0825; B30B 9/3007; B30B 9/3078
See application file for complete search history.

(56) References Cited

U.S. PATENT DOCUMENTS

| | | |
|---|---|---|
| 5,736,652 A | 4/1998 | Strubbe |
| 5,913,801 A | 6/1999 | Bottinger et al. |
| (Continued) | | |

FOREIGN PATENT DOCUMENTS

| | | |
|---|---|---|
| DE | 10360598 | 7/2005 |
| EP | 2962544 | 1/2016 |
| (Continued) | | |

OTHER PUBLICATIONS

EP151873759 Extended European Search Report dated Mar. 8, 2016 (6 pages).
(Continued)

*Primary Examiner* — Robert E Pezzuto
*Assistant Examiner* — Adam J Behrens
(74) *Attorney, Agent, or Firm* — Michael Best & Friedrich LLP (57) ABSTRACT

A baler having a compression system for forming a bale. The baler also has a feed system having a pack mode for accumulating the crop in a pre-compression chamber and a lift mode for conveying the crop to the compression system. The baler also has a sensor arrangement having at least one sensor generating a signal, the at least one sensor being coupled to the feed system. The signal corresponds to a crop load on the feed system. A control unit is configured to receive the signal from the sensor arrangement and initiate the lift mode based on at least the signal.

25 Claims, 4 Drawing Sheets

(51) Int. Cl.
  *A01F 15/08* (2006.01)
  *B30B 9/30* (2006.01)

(56) References Cited

U.S. PATENT DOCUMENTS

| | | | |
|---|---|---|---|
| 6,112,507 A * | 9/2000 | Mesmer | A01F 15/0825 100/88 |
| 6,474,228 B1 | 11/2002 | Leupe et al. | |
| 6,546,705 B2 * | 4/2003 | Scarlett | A01F 15/08 56/10.2 R |
| 7,096,653 B2 | 8/2006 | Shinners et al. | |
| 7,104,191 B1 | 9/2006 | Parker et al. | |
| 7,287,365 B2 * | 10/2007 | Dubois | A01F 15/101 100/88 |
| 7,331,168 B2 | 2/2008 | Dubois | |
| 7,404,355 B2 | 7/2008 | Viaud et al. | |
| 8,113,110 B2 | 2/2012 | Kraus | |
| 8,291,818 B2 * | 10/2012 | Matousek | A01F 15/0825 100/142 |
| 8,468,937 B2 | 6/2013 | Matousek et al. | |
| 8,770,102 B2 | 7/2014 | Verhaeghe et al. | |
| 8,924,091 B2 * | 12/2014 | Seeger | A01F 15/0825 100/237 |
| 9,010,240 B2 * | 4/2015 | Missotten | A01F 15/0825 100/188 R |
| 9,010,241 B2 * | 4/2015 | Naaktgeboren | A01F 15/101 100/142 |
| 9,101,092 B2 * | 8/2015 | Verhaeghe | A01F 15/0825 |
| 2007/0245704 A1 * | 10/2007 | Kraus | A01F 15/08 56/10.2 R |
| 2011/0191001 A1 | 8/2011 | Viaud et al. | |
| 2012/0179338 A1 * | 7/2012 | Dresher | A01F 15/101 701/50 |
| 2012/0186465 A1 * | 7/2012 | Dresher | A01F 15/101 100/35 |
| 2012/0186466 A1 * | 7/2012 | Vande Ryse | A01F 15/0825 100/43 |
| 2012/0266764 A1 | 10/2012 | Matousek et al. | |
| 2014/0366752 A1 * | 12/2014 | Naeyaert | A01F 15/101 100/189 |
| 2015/0373911 A1 * | 12/2015 | Weyne | A01D 57/12 56/341 |
| 2015/0373919 A1 | 12/2015 | Verhaeghe et al. | |
| 2016/0014965 A1 * | 1/2016 | Naeyaert | A01F 15/10 56/432 |

FOREIGN PATENT DOCUMENTS

| | | |
|---|---|---|
| WO | 2011012487 | 2/2011 |
| WO | 2014147179 | 9/2014 |

OTHER PUBLICATIONS

EP151873643 Extended European Search Report dated Mar. 8, 2016 (5 pages).
Office Action from the US Patent and Trademark Office for U.S. Appl. No. 14/855,153 dated May 19, 2017 (14 pages).
United States Patent Office Action for U.S. Appl. No. 14/855,153 dated Aug. 30, 2018 (16 pages).

\* cited by examiner

BALER WITH MASS FLOW SENSING ASSEMBLY AND METHOD OF INITIATING STUFFER TRIP

RELATED APPLICATIONS

This application claims priority to U.S. Provisional Patent Application No. 62/057,016 filed on Sep. 29, 2014 and is related to U.S. application Ser. No. 14/855,153 filed Sep. 15, 2015, which also claims priority to U.S. Provisional Patent Application No. 62/057,016, the contents of all of which are incorporated by reference herein.

BACKGROUND

The present disclosure relates to an agricultural baler having a compression system for forming bales of crop. Balers typically include a mechanical trip, such as a linkage or cable system, for mechanically initiating delivery of a flake of crop to the compression system. Such mechanical trips often include spring-loaded movable parts that retract in response to crop load and can clog requiring manual intervention.

SUMMARY

In one aspect, the disclosure provides a baler having a compression system for forming a bale, and a feed system having a pack mode for accumulating the crop in a pre-compression chamber and a lift mode for conveying the crop to the compression system. The baler also includes a sensor arrangement having at least one sensor generating a signal, the at least one sensor being coupled to the feed system. The signal corresponds to a crop load on the feed system. A control unit is configured to receive the signal from the sensor arrangement and initiate the lift mode based on at least the signal.

In another aspect, the disclosure provides a control system for a baler. The baler has a compression system for forming a bale, a feed system having a pack mode for accumulating the crop in a pre-compression chamber and a lift mode for conveying the crop to the compression system, a sensor arrangement including at least one sensor generating a signal, the at least one sensor being coupled to the feed system. The control system is configured to receive the signal from the sensor arrangement corresponding to a crop load on the feed system and initiate the lift mode based on at least the signal.

In yet another aspect, the disclosure provides a method of controlling a baler. The method includes receiving a signal from a sensor coupled to a feed system having a pack mode for accumulating crop in a pre-compression chamber of the baler, wherein the signal corresponds to a crop load on the feed system, and initiating a lift mode for conveying the crop to a compression system of the baler for forming a bale based on at least the signal.

Other aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of the formation and arrangement of components set forth in the following description or illustrated in the accompanying drawings. The disclosure is capable of supporting other implementations and of being practiced or of being carried out in various ways. Directions such as clockwise and counterclockwise used herein are for illustrative purposes only.

The disclosure relates to a machine, such as a baler 10. In the illustrated implementation, the disclosure relates to a square baler for forming bales 12 of a crop 14, such as hay. In other implementations, the disclosure may relate to other types of balers, such as other extrusion type balers or non-extrusion type balers, round balers, etc. In yet other implementations, the disclosure may relate to other types of machines, e.g., vehicles, tractors, harvesters, other types of agricultural machines, forestry machines, mining machines, construction machines, machines for manufacturing, etc.

Figure 1:
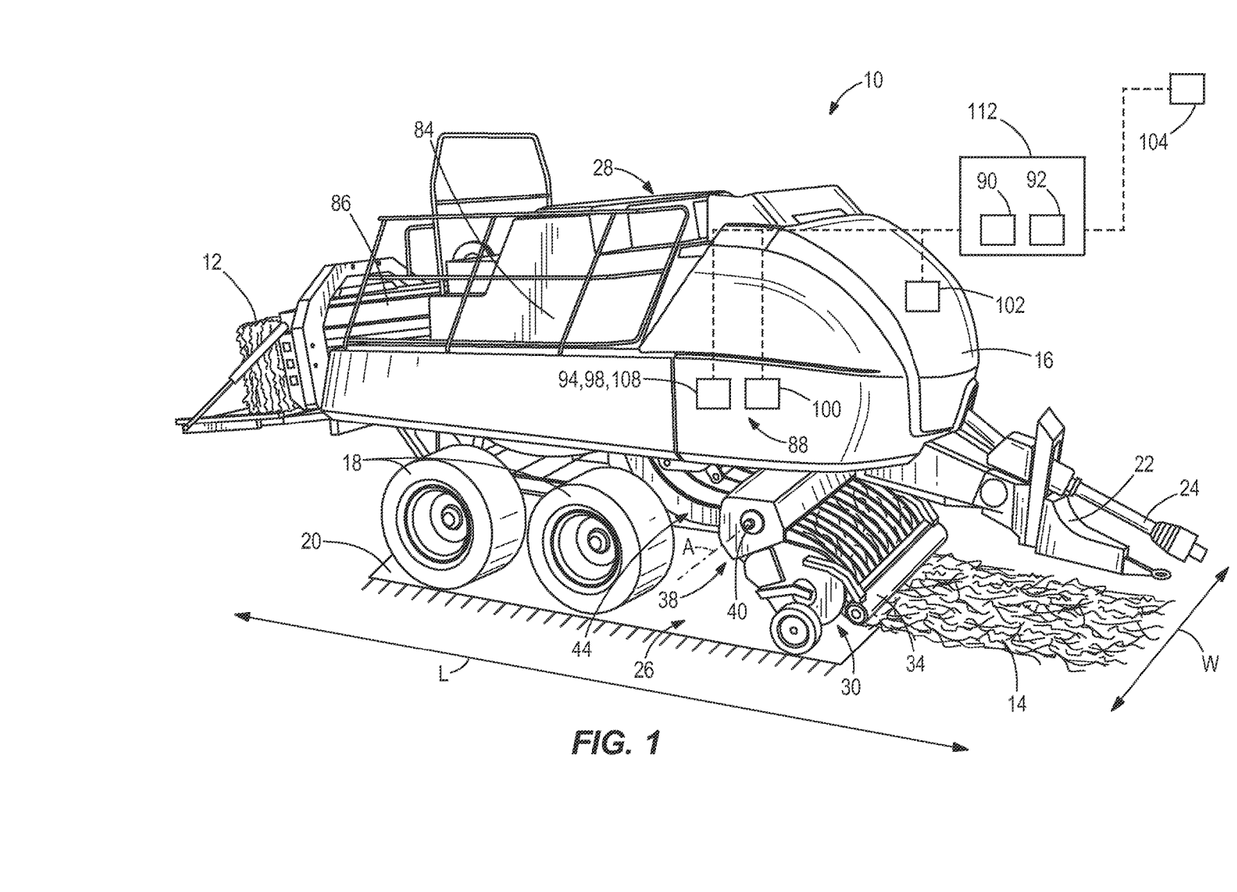
FIG. 1 is a perspective side view of a machine, such as a baler, having a sensor arrangement in accordance with one implementation of the present disclosure.

Referring to FIG. 1, the baler 10 includes a frame 16 supported by wheels 18 for travelling along a support surface 20, such as a field or road. The frame 16 defines a longitudinal direction L generally in the direction of travel of the baler 10 and a width direction W substantially perpendicular to the longitudinal direction L and defined as substantially parallel with the support surface 20. A tow bar 22 is attached to the frame 16, extends generally in the longitudinal direction L, and is connectable to a towing vehicle (not shown), such as an agricultural tractor or other driven vehicle. The baler 10 also includes a power takeoff shaft 24 connectable to the towing vehicle to transmit a rotating drive force from the towing vehicle to various components of the baler 10, such as the components that collect crop 14 and form bales 12, which will be described in greater detail below. In other implementations, the baler 10 may have a dedicated power supply and/or prime mover (not shown), such as an engine, motor, battery, fuel cell, etc., for driving the wheels 18 and for driving and/or powering the various components of the baler 10.

Figure 3:
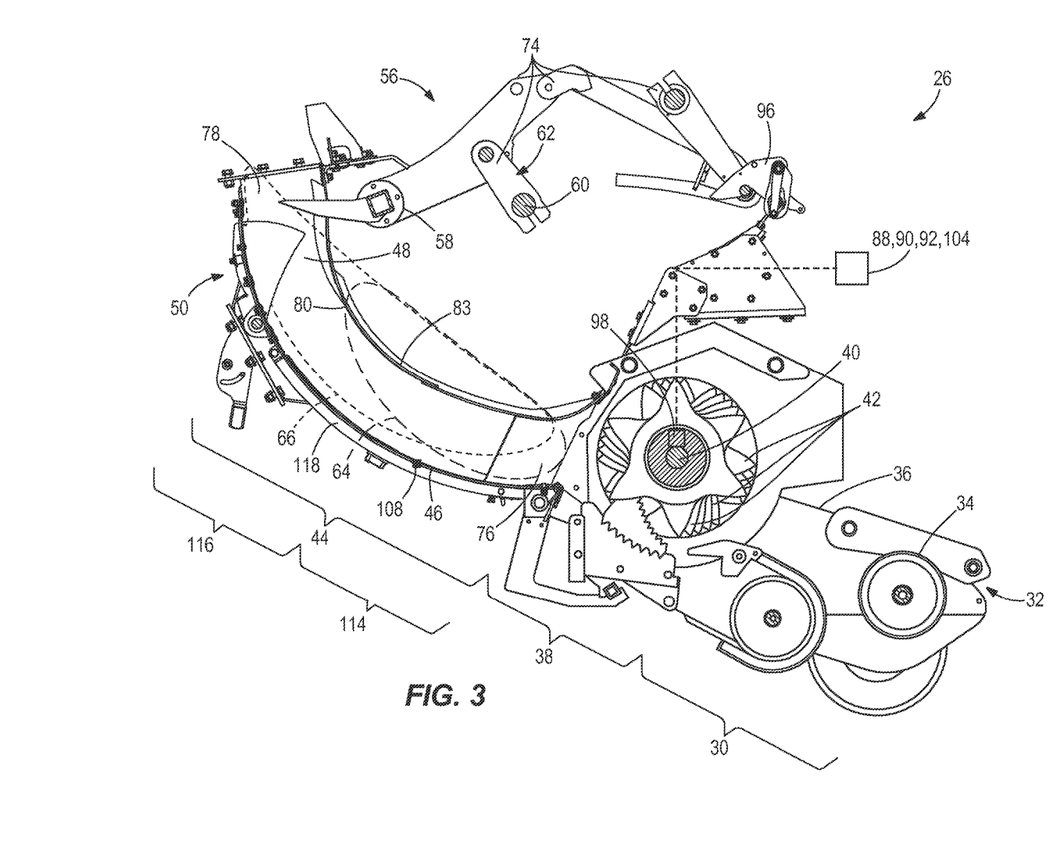
FIG. 3 is a side view of the supply assembly of FIG. 2.

Referring also to FIG. 3, the baler 10 includes a feed system 26 for picking up the crop 14 from the surface and conveying the crop 14 to a compression system 28 (see FIG. 1) to be formed into a bale 12. The compression system 28 compresses the crop 14 (e.g., by way of a plunger or a belt) into a densely packed shape, such as a square or round bale. In the illustrated implementation, the feed system 26 includes a pickup assembly 30 defining an inlet 32 for receiving the crop 14 from the surface. The pickup assembly 30 includes a roller baffle 34 oriented generally in the width direction W for picking up the crop 14 and placing the crop 14 in the baler 10. The pickup assembly 30 includes a pickup plate 36 disposed adjacent the roller baffle 34 for conveying the crop 14 towards a cutter assembly 38. The pickup plate 36 may include a continuous loop surface, e.g., a moving conveyor, driven for conveying the crop 14, or other suitable mechanisms. The cutter assembly 38 includes an elongated cutter shaft 40 oriented generally in the width direction W and carrying a series of cutters or blades 42 for cutting the crop 14. The cutter assembly 38 rotates about a central axis A of the cutter shaft 40, the central axis A being oriented generally in the width direction W substantially parallel to the roller baffle 34. In other implementations, the pickup assembly 30 and cutter assembly 38 may have different constructions and orientations with respect to the baler 10 and with respect to each other.

Figure 2:
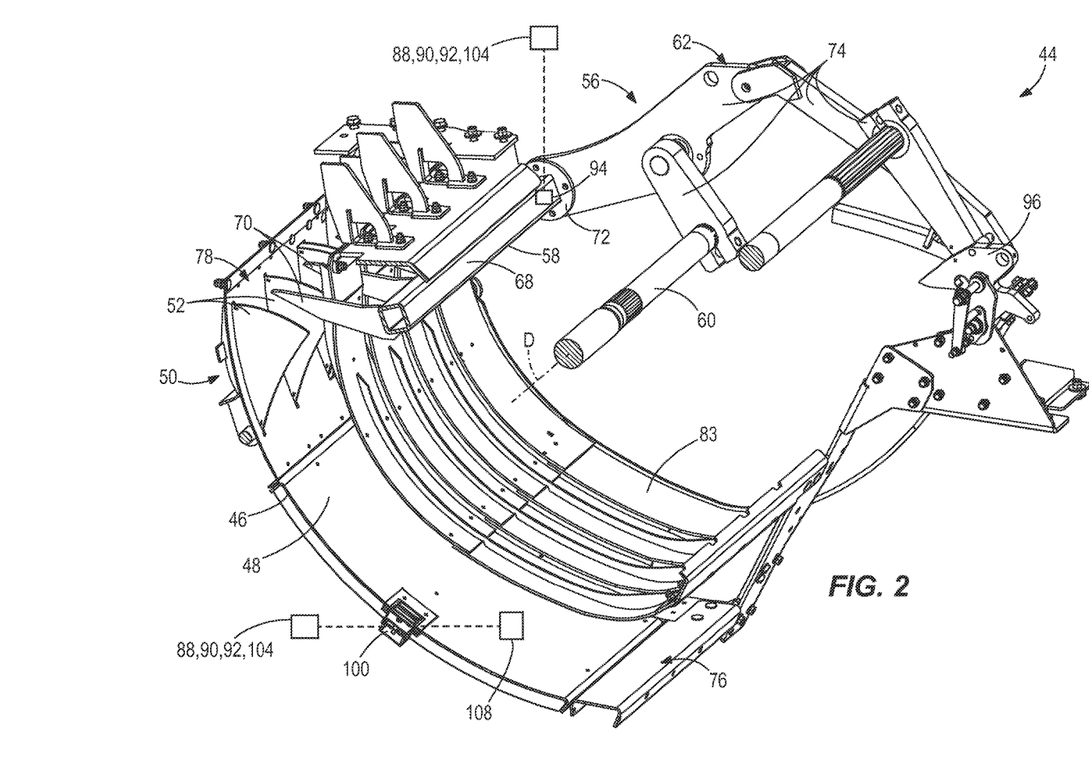
FIG. 2 is an enlarged perspective cross-sectional view of a supply assembly, which is a portion of the machine of FIG. 1.

Referring to FIGS. 2 and 3, the feed system 26 also includes a lifter assembly 44 having a feed pan 46 and strippers 83 cooperating with the pickup assembly 30 and the cutter assembly 38 for receiving the crop 14 from the cutter assembly 38. The feed pan 46 and the strippers 83 define a pre-compression chamber 48, along with any side walls (not shown) extending generally from the feed pan 46 toward the strippers 83. In the illustrated implementation, the pre-compression chamber 48 has a mechanical trip mechanism 50 disposed therein for reacting to the crop load in the pre-compression chamber 48 and tripping the lifter assembly 44 into a lift stroke, which will be described in greater detail below. In some implementations, the pre-compression chamber 48 does not have the mechanical trip mechanism 50. In the illustrated implementation, the feed pan 46 is curved in substantially the shape of an arc; however, in other implementations, the feed pan 46 may have other curved shapes or may be straight. The pre-compression chamber 48 (e.g., the feed pan 46) includes an approximate midpoint 118, an upstream half 114 upstream of the approximate midpoint 118, and a downstream half 116 downstream of the approximate midpoint 118, all relative to the direction of crop movement through the pre-compression chamber 48 toward the compression system 28.

Figure 4:
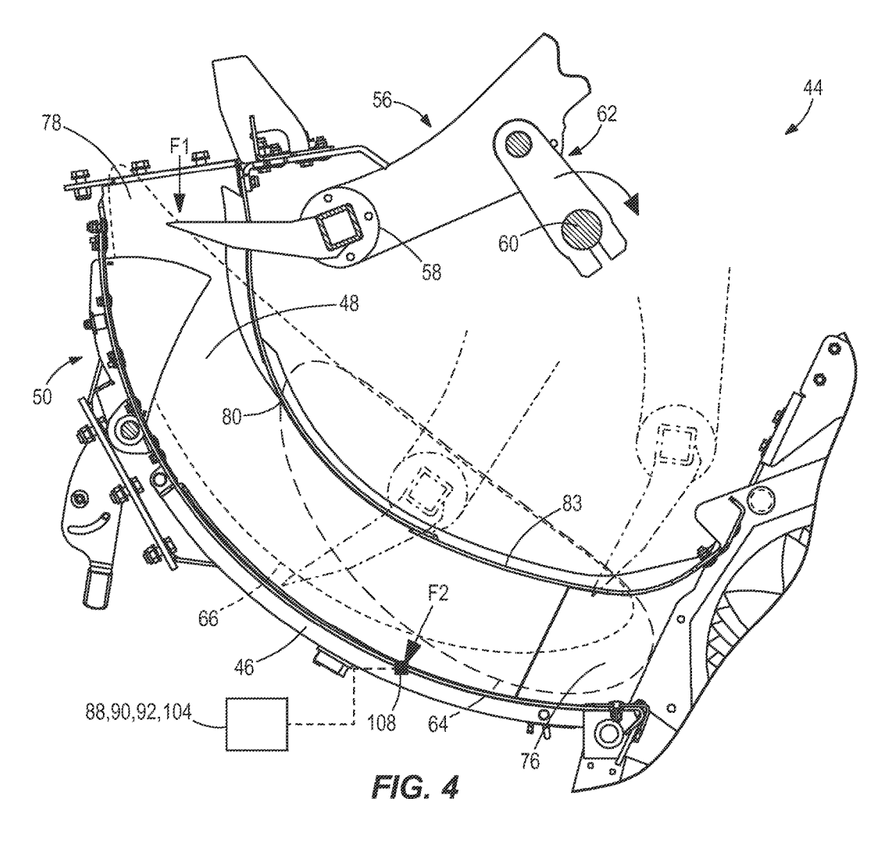
FIG. 4 is an enlarged view of FIG. 3 illustrating the loading fork assembly in various stages of operation.

The lifter assembly 44 also includes a loading fork 56 cooperating with the feed pan 46 and movable through the feed pan 46 within the pre-compression chamber 48 for pre-compressing the crop 14, thereby increasing the crop load in the pre-compression chamber 48. The loading fork 56 includes a fork member 58 coupled to a driving shaft 60 by a loading fork linkage 62. The driving shaft 60 is rotatable about a stationary drive axis D for driving the fork member 58 along a pack path 64 and a lift path 66, as illustrated in FIGS. 2-4. The fork member 58 includes a fork bar 68 having an elongated shape and extending generally in the width direction W. The fork member 58 also includes a plurality of forks 70 extending from the fork bar 68 towards the feed pan 46. In other implementations, the fork member 58 may have other shapes and configurations for sweeping the crop 14. The fork member 58 is rotatably coupled to the loading fork linkage 62 at a fork member joint 72. The loading fork linkage 62 includes a plurality of arms 74, at least one of which is interconnected between the fork member 58 and the driving shaft 60.

The loading fork linkage 62 is operable in a pack mode and a lift mode. In the pack mode, the loading fork linkage 62 assumes a pack configuration in which the fork member 58 is driven through the pack path 64 on a pack stroke. In the lift mode, the loading fork linkage 62 assumes a lift configuration in which the fork member 58 is driven through the lift path 66 on the lift stroke. The pack path 64 forms a first continuous loop in which the fork member 58 passes through the feed pan 46 from a receiving end 76 adjacent the cutter assembly 38 (i.e., the beginning of the pack path 64) towards a supplying end 78 adjacent the compression system 28, exits the feed pan 46 at an intermediate point 80 between the receiving end 76 and the supplying end 78, and returns to the receiving end 76 to begin again. The lift path 66 forms a second continuous loop that can be larger than the first continuous loop (as shown in the illustrated embodiment) in which the fork member 58 passes through the feed pan 46 from the receiving end 76 adjacent the cutter assembly 38 towards the supplying end 78 adjacent the compression system 28. On the lift path 66, the fork member 58 exits the feed pan 46 at an exit point closer to the supplying end 78, and closer to the compression system 28, than the intermediate point 80 in the pack path 64 and then returns to the receiving end 76. In some implementations, the fork member 58 may enter the compression system 28, e.g., a bale chamber to be described below, on the lift stroke.

Thus, in the pack path 64, the fork member 58 directs crop 14 from the cutter assembly 38 into the feed pan 46 and compresses the crop 14 in the pre-compression chamber 48. In the lift path 66, the fork member 58 conveys the crop 14 into the compression system 28. The load of crop conveyed into the compression system 28 on the lift stroke is called a flake. Furthermore, the loading fork 56 may be referred to herein as the stuffer, particularly with reference to initiation of the lift mode.

In other implementations, the feed system 26 may include other structures and configurations, such as those known in other types of balers, such as round balers.

The compression system 28 includes a plunger (not shown) for compressing the crop 14, a bale chamber 84 for receiving and shaping the compressed crop 14, and a bale case or extruder 86 for compressing and dispensing/extruding the compressed crop 14 in the form of a bale 12. The bale chamber 84 is disposed adjacent the supplying end 78 of the feed pan 46 for receiving a load of crop, i.e., the flake, from the pre-compression chamber 48. Generally, in the pack mode, the fork member 58 packs crop in the pre-crompression chamber 48 and, in the lift mode, the fork member 58 lifts crop from the pre-compression chamber 48 and lifts the crop into the bale chamber 84. The plunger (not shown) is configured for reciprocating motion in the bale chamber 84 to compact and compress the crop 14 in the bale chamber 84 on each lift stroke. In the illustrated implementation, the bale chamber 84 has a rectangular cross-section for forming square or rectangular bales; however, in other implementations the bale chamber 84 may have other cross sections and configurations. As the bale 12 forms, the bale 12 is packed from the bale chamber 84 into the bale case 86 from which the bale 12 is extruded and/or released. Between the bale chamber 84 and the bale case 86, a knotter assembly (not shown) dispenses, wraps, cuts, and ties loops of twine around the bale 12 in response to a bale length sensor (not shown), such as a star wheel, when a predetermined bale length is reached.

In other implementations, the compression system 28 may include other structures and configurations, such as those known in other types of balers, such as round balers.

The baler 10 includes a sensor arrangement 88 having one or more sensors of the same or differing types. The sensor arrangement 88 is electrically coupled to a control unit 112 having a memory storage device 90 and a data manipulation device 92. The sensor arrangement 88 transmits data in the form of an electrical signal or signals to the control unit 112, which in turn transmits an electrical signal or signals to a display device 104 (FIG. 1) and to components of the baler 10 for controlling components of the baler 10, as will be described in greater detail below. More specifically, the control unit 112 includes input and output circuits, a programmed processor or microprocessor (e.g., the data manipulation device 92) and memory (e.g., the memory storage device 90). The display device 104 may include a screen, such as a liquid crystal display (LCD), a light emitting diode (LED) display, a cathode ray tube (CRT) display, a nanotube display, an audio display including a speaker, or the like.

In one implementation, the sensor arrangement 88 includes a sensor 94 associated with the loading fork 56 for detecting a crop load or force F1 (FIG. 4) applied to the fork member 58 and generating data in the form of a signal or value representative of the force, strain, or torque on, or the deflection of, a component of the loading fork 56. For example, the sensor 94 may include a strain gage applied to a component of the loading fork 56, such as the fork bar 68 (as illustrated in FIG. 2), the loading fork linkage 62, the driving shaft 60, a portion of the loading fork linkage 62 or arm adjacent the fork bar 68, a portion of the loading fork linkage 62 or arm adjacent the driving shaft 60, a catch hook 96, any combination of these locations, or other locations indicative of load (e.g., force, torque) applied to the fork member 58.

Additionally or alternatively, the sensor 94 may be positioned to monitor the loading on the power take off shaft 24 to detect the crop load or force, or in those implementations with a dedicated power supply or prime mover, the loading (e.g., force, torque, load current, etc.) associated therewith.

The sensor arrangement 88 may, additionally or alternatively, include a sensor 98 associated with the cutter assembly 38 for detecting crop load or force on the cutter assembly 38 and generating a signal or value representative of the crop load or force on the cutter assembly 38.

Furthermore, the sensor arrangement 88 may, additionally or alternatively, include a sensor 108 associated with the pre-compression chamber 48 (i.e., a component defining the pre-compression chamber 48, such as the feed pan 46), for detecting crop load or contact force F2 impinging on one or more of the components defining the pre-compression chamber 48, e.g., generally normal to the one or more components. For example, the sensor 108 may also be disposed on the side walls (not shown) defining and enclosing the pre-compression chamber 48 from the sides and/or on the strippers 83 defining and enclosing the pre-compression chamber 48 from the top. The sensor 108 may also be coupled to the mechanical trip mechanism 50. In some implementations, the sensor 108 is located closer to the approximate midpoint 118 of the feed pan 46 (or generally of the pre-compression chamber 48) than to the supplying end 78. For example, the sensor 108 may be in the upstream half 114 of the pre-compression chamber 48. As another example, the sensor 108 may be closer to the receiving end 76 of the feed pan 46 than to the approximate midpoint 118 of the pre-compression chamber 48. As yet another example, the sensor 108 may be just less than halfway between the approximate midpoint 118 and the supplying end 78 of the pre-compression chamber 48. In yet other implementations, the sensor 108 may be in the downstream half 116 of the pre-compression chamber 48.

The sensor 108 generates data in the form of an electrical signal or value representative of the crop load or contact force F2 impinging on the component defining the pre-compression chamber 48, such as the feed pan 46. For example, the sensor 108 may include a contact pressure sensor, such as a load cell, a strain gage, a movably mounted load plate, etc., coupled to the feed pan 46 bottom, sides, top or other component defining the pre-compression chamber 48. The sensor 108 may also include a movably mounted device to measure the contact force F2 by measurement of deflection of the movably mounted device.

In other implementations, the sensor arrangement 88 may additionally or alternatively include other types of sensors for sensing the crop load or force, such as a contact pressure sensor, for example a contact pressure plate, for detecting the impact of crop 14 on a surface. The sensor arrangement 88 may include one or more contact pressure sensors coupled to various components of the feed system 26, such as the forks 70, e.g., to one or more of the forks 70, the feed pan 46, the roller baffle 34, the pickup plate 36, or other components in direct or indirect contact with the crop 14. The contact pressure sensor may be configured to directly or indirectly measure the force of the crop 14 impinging on one or more components of the baler 10, e.g., generally normal to the component.

In yet other implementations, the sensor arrangement 88 additionally or alternatively includes a moisture sensor 100 for sensing moisture or humidity and generating a moisture signal indicative of the moisture or humidity of the crop 14 or the air within any part of the baler 10. The moisture sensor 100 may be disposed in communication with the feed pan 46, e.g., in or adjacent the pre-compression chamber 48, as shown in FIG. 2. In other implementations, the moisture sensor 100 may be located in other locations where the crop 14 can be found, such as the pickup assembly 30, the cutter assembly 38, the fork member 58, the bale chamber 84, the bale case 86, etc.

In some other implementations, the sensor arrangement 88 may additionally or alternatively include other types of sensors for sensing other parameters and conditions, for example, temperature. In yet other implementations, other types of sensors (e.g., electronic, mechanical, optical, piezoelectric, Hall effect, magnetic, electromagnetic, etc.) may be employed.

The sensor arrangement 88 may include any combination of one or more of any of the sensors discussed herein.

The sensor arrangement 88 additionally may also take other measurements such as time, displacement, and distance that are useful for other calculations, such as distance traveled, time, bale time, mean velocity, location of bale creation and bale completion, bale creation duration, bale driven distance, flakes per bale, strokes per bale, stroke to flake ratio, bale length left, bale length right, fork load, crop moisture, etc., which is collected and stored in the memory storage device 90. The data may be manipulated by the data manipulation device 92, and the data and/or the manipulated data may be displayed on the display device 104 in real time and/or after the data is collected. For example, the data may be stored and thereafter downloadable for processing after the baling operation. The display device 104 may be disposed in or on the towing vehicle and/or the baler 10, and may also include one or more auxiliary display devices 104 used after the data is transferred to other devices.

The control unit 112 is operably coupled to the feed system 26 and operable to control the pack and lift modes of the lifter assembly 44 based at least in part on the signal or signals from the sensor assembly 88. The signal or signals from the sensor assembly 88 are electrical signals conveyed by wire or wirelessly to the processor of the control unit 112, which in turn controls the pack and lift modes of the lifter assembly 44 at least in part by sending an electrical signal or signals conveyed by wire or wirelessly to control the lifter assembly 44. For example, the control unit 112 controls an actuator (not shown) that moves the catch hook 96 into and out of a pack position in which the loader fork moves in the pack path 64 (pack mode) and a lift position in which the loader fork moves in the lift path 66 (lift mode). In other implementations, rather than the sensor assembly 88 sending an electronic signal to trip the loader fork into the lift mode, the baler 10 may include a hydraulic or pneumatic system that could trip the lift mode based on force balance, e.g., the catch hook 96 may be moved between the lift position and the pack position based on the force balance.

More specifically, the control unit 112 is operable to initiate the lift mode in response to the signal or signals, e.g., in response to an increase in crop load in the feed system 26, as measured by the sensor arrangement 88. Even more specifically, the control unit 112 is operable to initiate the lift mode in response to an increase in crop load in pre-compression chamber 48, e.g., the feed pan 46, based on a reading of the signal or signals from the sensor assembly 88. Even more specifically, the control unit 112 is operable to initiate the lift mode in response to an increase in crop load in the pre-compression chamber 48 at a location closer to the approximate midpoint 118 of the pre-compression chamber 48 than to the supplying end 78. Even more specifically still, the control unit 112 is operable to initiate the lift mode in response to an increase in crop load in the upstream half 114 of the pre-compression chamber 48. Even more specifically still, the control unit 112 is operable to initiate the lift mode in response to an increase in crop load in the upstream half 114 of the pre-compression chamber 48 closer to the receiving end 76 than to the approximate midpoint 118.

In some implementations, the control unit 112 bases initiation of the lift mode on the signal or signals from the sensor 94 associated with the loading fork 56. Thus, the control unit 112 initiates the lift mode when the crop load, or crop mass, on the loading fork 56 increases and/or reaches a predetermined level. In other implementations, the control unit 112 bases initiation of the lift mode on the signal or signals from the sensor 108 associated with the pre-compression chamber 48. Thus, the control unit 112 initiates the lift mode when the crop load, or crop mass, on the pre-compression chamber 48 increases and/or reaches a predetermined level. In yet other implementations, the control unit 112 bases initiation of the lift mode on the signals from both the sensor 94 associated with the loading fork 56 and the sensor 108 associated with the pre-compression chamber 48. Thus, the control unit 112 initiates the lift mode when the crop load, or crop mass, on both the loading fork 56 and the pre-compression chamber 48 increase and/or reach predetermined levels, respectively. The signals from the sensors 94, 108 may be used together to refine the calculated crop load. Thus, the accuracy of the crop load calculation is improved when using signals from two sensors. Also, signals from any two or more of the sensors in the sensor arrangement 88 described above may be used to refine the calculated crop load and thereby initiate the lift mode based on a refined calculation of crop load. Furthermore, the control unit 112 may specifically utilize the signal or signals from the sensor 94 when the sensor 94, which is associated with the movable loading fork 56, is moving in the downstream direction.

In some implementations, the lift mode is initiated when the crop load on the loading fork 56 and/or on the pre-compression chamber 48 increases a predetermined amount during the beginning of the pack stroke. That is, the control unit 112 may utilize the signal or signals from the sensor 94 and/or the sensor 108 when the sensor 94 and/or the sensor 108 is positioned closer to the approximate midpoint 118 of the pre-compression chamber 48 than to the supply end 78, or is positioned in or proximate the upstream half 114 of the pre-compression chamber 48, or is positioned closer to the receiving end 76 than to the approximate midpoint 118.

Crop moisture may also be considered by the control unit 112 in determining when to initiate the lift mode.

In still other implementations, the control unit 112 bases initiation of the lift mode on a signal or signals from any one or more of the sensors in the sensor arrangement 88. Thus, the control unit 112 initiates the lift mode when the crop load, or crop mass, on the feed system 26 increases and/or reaches a predetermined level, and/or when the crop moisture reaches a predetermined level. The predetermined levels may be selected, preprogrammed, and/or adjusted based on the type of crop and the conditions.

In operation, the roller baffle 34, the cutter shaft 40, the driving shaft 60 of the loading fork 56, the plunger, etc., are driven or powered ultimately by the tractor vehicle by way of the power takeoff shaft 24, or by the dedicated power supply or prime mover in other implementations. The pickup assembly 30 receives crop 14 from the surface and conveys the crop 14 to the cutter assembly 38, which cuts the crop 14 and feeds the crop 14 to the lifter assembly 44. The lifter assembly 44 compresses the crop 14 into the pre-compression chamber 48 during the pack mode and then lifts and conveys the crop 14, now the flake, into the bale chamber 84 during the lift mode, thereby conveying the crop 14 to the compression system 28. The lift mode is initiated, or tripped, when the control unit 112 determines that the predetermined level of crop load and/or moisture has been reached in the pre-compression chamber 46. In some implementations, the lift mode is initiated when the control unit 112 determines that the predetermined level of crop load has been reached in the front of the pre-compression chamber 48, e.g., in the upstream half 114. Then, the plunger of the compression system 28 compresses the flake into the forming bale in the bale chamber 84. When the bale length sensor determines that the bale 12 has reached the predetermined length, the knotters tie twine around the bale 12 and the bale 12 is extruded through the bale case 86 as the next bale is formed behind it.

The sensors 94, 98, 108 measure the instantaneous load applied to the loading fork 56, and/or the cutter assembly 38, and/or the pre-compression chamber 48, and/or the compression system 28 by the crop 14, and are therefore indicative of the mass of the crop 14. The data are manipulated using the data manipulation device 92 to determine a value corresponding with crop mass through the baler 10, e.g., mass flow through the lifter assembly 44 and pre-compression chamber 48, and/or mass flow through the cutter assembly 38, and/or mass flow through the pickup assembly 30.

For example, the crop load F1 on the fork member 58 during a portion or all of the lift stroke can be integrated, summed, or otherwise manipulated by the data manipulation device 92 over at least a portion of the course of the sweep (i.e., a portion of the lift path 66 in which the forks 70 are disposed substantially within the pre-compression chamber 48 on an upstroke for lifting the crop 14 from the receiving end 76 to the supplying end 78 and into the bale chamber 84) to output a value or output 106 that corresponds with bale flake mass. Time may also be recorded and a corresponding time coupled with each mass data point, which in turn may be processed by the data manipulation device 92 to calculate mass flow rate.

The contact force F2 may additionally or alternatively be processed by the data manipulation device 92 to calculate and/or refine the mass data. In some implementations, signals from the sensor 94 and the sensor 108 are used together to generate the mass data; however, other signals from any single sensor or any combination of sensors in the sensor arrangement 88 may be used to generate the mass data.

The moisture sensor 100 data may additionally be processed in the data manipulation device 92 to further refine the mass output 106, accounting for variations attributable to moisture or humidity of the crop 14 or the air. For example, excess moisture may cause sticking of the crop 14, which may influence the force F1 on the fork member 58. Furthermore, wet crop has a portion of its mass attributed to water. By taking moisture levels of the crop 14 into account in the data manipulation device 92, the data may be manipulated to achieve a more accurate calculation of mass of the crop 14 as a dry crop.

Furthermore, multiple load sensors may work to provide multiple load signals to the data manipulation device 92. The multiple load sensors could work redundantly, or as checks on each other, etc., to increase accuracy and reliability of the mass output 106, and alone or in combination with the moisture sensor 100, time, temperature, etc. Likewise, multiple sensors of other types, such as the types described above, may similarly be applied in any combination to the data manipulation device 92 to increase accuracy of the output 106.

As such, various sensors of the sensor arrangement 88 may be employed to collect the data that may be used to determine or approximate crop mass flow through the baler 10. In some of the implementations described above, crop mass flow, or crop load, is measured with essentially static, or fixed, sensors that do not move substantially relative to the mounting structure of the baler. As such, the risk of clogging is reduced by the elimination of moving and/or retracting parts.

Thus, the disclosure provides, among other things, a sensing apparatus and method for determining a value associated with crop mass, and a method for initiating a stuffer trip cycle for conveying a flake of crop to the compression system, the method being based on the crop load sensed by the sensor arrangement. While the above describes example embodiments of the present disclosure, these descriptions should not be viewed in a limiting sense. Rather, there are several variations and modifications which may be made without departing from the scope of the present disclosure.

What is claimed is:

1. A baler comprising:
    a compression system for forming a bale;
    a feed system including a loading fork assembly, the loading fork assembly including
        a fork member having a fork bar with a plurality of forks extending therefrom, and
        at least one arm coupled to the fork bar, the at least one arm movable in a pack mode for accumulating a crop in a pre-compression chamber and in a lift mode for conveying the crop to the compression system, wherein the pre-compression chamber includes an upstream half and a downstream half relative to the direction of crop movement downstream toward the compression system;
    a sensor arrangement including at least one sensor generating a signal, the at least one sensor being coupled to the loading fork assembly, wherein the signal corresponds to a crop load on the loading fork assembly; and
    a control unit configured to receive the signal from the sensor arrangement, wherein the control unit is configured to control operation of the at least one arm based on at least the signal from the loading fork assembly meeting a threshold when the plurality of forks are in the upstream half of the pre-compression chamber.

2. The baler of claim 1, wherein the at least one arm is mounted for movement along a first path in the pack mode and along a second path in the lift mode.

3. The baler of claim 2, wherein the signal is a first signal, wherein the sensor arrangement includes a second sensor coupled to the pre-compression chamber generating a second signal corresponding to a crop force on the pre-compression chamber generally normal to the pre-compression chamber, wherein the control unit is configured to change a shape of travel of the at least one arm based at least on the first and second signals such that the first path is shaped different than the second path.

4. The baler of claim 3, wherein the control unit is configured to change the shape of travel of the at least one arm based at least on an increase in the first and second signals.

5. The baler of claim 1, wherein the at least one sensor is a first sensor and the signal is a first signal; wherein the sensor arrangement includes a second sensor coupled to the pre-compression chamber generating a second signal corresponding to a crop force on the pre-compression chamber generally normal to the pre-compression chamber, wherein the control unit is configured to control the operation of the at least one arm based at least on the first and second signals.

6. The baler of claim 5, wherein the pre-compression chamber includes a supply end, a midpoint, and a receiving end relative to the direction of crop movement toward the compression system, wherein the second sensor is disposed closer to the midpoint than to the supply end.

7. The baler of claim 6, wherein the second sensor is disposed generally between the midpoint and the receiving end.

8. A control system for a baler having a compression system for forming a bale, a feed system including a loading fork assembly, the loading fork assembly including a fork member having a fork bar with a plurality of forks extending therefrom and at least one arm coupled to the fork bar, the at least one arm movable in a pack mode for accumulating the crop in a pre-compression chamber and in a lift mode for conveying the crop to the compression system, wherein the pre-compression chamber includes an upstream half and a downstream half relative to the direction of crop movement downstream toward the compression system, at least one sensor generating a signal, the at least one sensor being coupled to the loading fork assembly, the control system comprising:
    a control unit configured to:
        receive the signal from the at least one sensor corresponding to a crop load on the loading fork assembly;
        determine whether the signal meets a threshold when the plurality of forks are disposed in the upstream half of the pre-compression chamber; and
        control operation of the at least one arm based on at least the signal meeting the threshold in the upstream half of the pre-compression chamber.

9. The control system of claim 8, wherein the at least one arm is mounted for movement along a first path in the pack mode and along a second path in the lift mode, the control unit further configured to:
    control operation of the at least one arm by changing a distance of travel of the at least one arm.

10. The control system of claim 9, wherein the at least one sensor is a first sensor, wherein the signal is a first signal, further comprising a second sensor configured to generate a second signal corresponding to a crop load on and normal to the pre-compression chamber, wherein the control unit is further configured to:

change the distance of travel of the at least one arm based on at least the first and second signals coming from the upstream half of the feed system.

11. The control system of claim 10, wherein the second sensor is disposed on at least one of a feed pan, a wall, or a stripper defining the pre-compression chamber.

12. The control system of claim 11, wherein the control unit is further configured to change the distance of travel of the at least one arm based at least on an increase in the first and second signals.

13. The control system of claim 8, wherein the at least one sensor is a first sensor and the signal is a first signal; wherein the at least one arm is mounted for movement along a first path in the pack mode and along a second path in the lift mode; further comprising a second sensor coupled to the pre-compression chamber generating a second signal corresponding to a crop force normal to the pre-compression chamber, wherein the control unit is configured to control operation of the at least one arm based at least on the first and second signals.

14. The control system of claim 10, wherein the second sensor is disposed closer to a receiving end of the feed pan than to an approximate midpoint of the pre-compression chamber.

15. A method of controlling a baler comprising:
    receiving, with a control unit, a signal from a sensor coupled to a feed system including a loading fork assembly, the loading fork assembly including a fork member having a fork bar with a plurality of forks extending therefrom, and at least one arm coupled to the fork bar, the at least one arm movable in a pack mode for accumulating crop in a pre-compression chamber of the baler and a lift mode for conveying the crop to a compression system of the baler for forming a bale, wherein the signal corresponds to a crop load on the loading fork assembly, wherein the feed system includes an upstream half and a downstream half relative to the direction of crop movement downstream toward the compression system;
    determining, with the control unit, whether the signal meets a threshold when the plurality of forks are disposed in the upstream half of the feed system; and
    controlling, with the control unit, operation of the at least one arm based on at least the signal when the signal is generated and meets the threshold in the upstream half of the feed system.

16. The method of claim 15, wherein the controlling is further based on a force impinging on the pre-compression chamber.

17. The method of claim 15, wherein the at least one arm is controlled in response to the crop load on the loading fork assembly in the upstream half increasing a predetermined amount.

18. The method of claim 15, wherein the controlling is further based on a force impinging on the pre-compression chamber generally normal to the pre-compression chamber at a location closer to a midpoint of the pre-compression chamber than to a supply end of the pre-compression chamber.

19. The baler of claim 1, wherein the at least one arm is mounted for movement along a first path in the pack mode and along a second path in the lift mode, the second path being shaped different from the first path, wherein the control unit is configured to initiate movement of the at least one arm along the second path based on at least the signal.

20. The baler of claim 19, wherein the control unit is configured to move a mechanical actuator between a pack position and a lift position based on at least the signal to change movement of the at least one arm.

21. The baler of claim 19, wherein the first and second paths are circuitous, and wherein the second circuitous path for the lift mode is longer than the first circuitous path for the pack mode.

22. The control system of claim 8, wherein the at least one arm is mounted for movement in a first path in the pack mode and a second path in the lift mode, the second path being different from the first path, wherein the control system is further configured to initiate the second path in the lift mode based on at least the signal.

23. The method of claim 15, wherein the at least one arm is mounted for movement in a first path in the pack mode and a second path in the lift mode, the second path being shaped different from the first path, wherein the initiating step further includes initiating the second path in the lift mode based on at least the signal.

24. The baler of claim 1, wherein the pre-compression chamber includes a supply end, a midpoint, and a receiving end relative to the direction of crop movement toward the compression system, and wherein the control unit is further configured to control operation of the at least one arm based on at least the signal from the loading fork assembly meeting a threshold when the plurality of forks are in the upstream half of the pre-compression chamber closer to the receiving end than to the approximate midpoint.

25. The baler of claim 1, further comprising a catch hook movable between a pack position mechanically effectuating the pack mode movement of the at least one arm and a lift position mechanically effectuating the lift mode movement of the at least one arm, wherein the control unit is further configured to control movement of the catch hook between the pack position and the lift position based on at least the signal from the loading fork assembly meeting a threshold if the signal corresponds to the load on the loading fork assembly when the forks are in the upstream half of the pre-compression chamber.

\* \* \* \* \*